United States Patent
Hester

(10) Patent No.: US 6,639,138 B1
(45) Date of Patent: Oct. 28, 2003

(54) MUSIC EDUCATION SYSTEM

(76) Inventor: Timothy Eugene Hester, 3730 Purdue St., Houston, TX (US) 77005-1128

(*) Notice: Subject to any disclaimer, the term of this patent is extended or adjusted under 35 U.S.C. 154(b) by 0 days.

(21) Appl. No.: 09/923,309

(22) Filed: Aug. 7, 2001

Related U.S. Application Data

(60) Provisional application No. 60/225,928, filed on Aug. 17, 2000.

(51) Int. Cl.[7] .............................................. G09B 15/08
(52) U.S. Cl. ........................................ 84/470 R; 705/5
(58) Field of Search ...................... 84/470 R; 705/5–9

(56) References Cited

U.S. PATENT DOCUMENTS

| | | | | |
|---|---|---|---|---|
| 5,434,908 A | * | 7/1995 | Klein ....................... | 379/88.23 |
| 5,491,751 A | * | 2/1996 | Paulson et al. | |
| 5,722,418 A | * | 3/1998 | Bro ............................. | 128/905 |
| 6,275,863 B1 | * | 8/2001 | Leff et al. .................... | 707/201 |
| 6,334,779 B1 | * | 1/2002 | Siefert ......................... | 434/322 |
| 6,427,063 B1 | * | 7/2002 | Cook et al. .................. | 434/350 |
| 2002/0007717 A1 | * | 1/2002 | Uehara ......................... | 84/600 |
| 2002/0087560 A1 | * | 7/2002 | Bardwell ..................... | 707/100 |

* cited by examiner

Primary Examiner—Jeffrey Donels
(74) Attorney, Agent, or Firm—Russell J. Egan

(57) ABSTRACT

A music education system has a database which included all pertinent information on rooms, teachers, students, accompanists, and administration. This allows for matching of students, teachers, rooms, etc. and printing of schedules for all persons involved in a music program. A music library assists in practicing and preparatory score study by individual musicians with or without accompaniment. Each selection includes multiple recordings of cues and parts allowing selection of which part is to be played by the musician and by the accompanist. This can include sectional or skeletal tracks.

26 Claims, 4 Drawing Sheets

Schedule for Timothy Hester - Spring 2001
as of 03-Jul-01 09:49 AM

| | Monday | Tuesday | Wednesday | Thursday | Friday | Saturday | Sunday |
|---|---|---|---|---|---|---|---|
| 8:00 | | | | | | | |
| 8:30 | | | | | Keyboard Collaborative Techniques 0- thester@uh.edu | | |
| 9:00 | | Julie McCauley (713)874-1947 Lichtenthal14@aol.com | Chamber Music | Tsz Kuen Lau (713)870-8829 tkilau@pchome.com.tw | Keyboard Collaborative Techniques 0- thester@uh.edu | | |
| 9:30 | | Julie McCauley (713)874-1947 Lichtenthal14@aol.com | Chamber Music | Tsz Kuen Lau (713)870-8829 tkilau@pchome.com.tw | Keyboard Collaborative Techniques 0- thester@uh.edu | | |
| 10:00 | | Coffee Committee 0- thester | Chamber Music | Coffee Committee 0- thester | Chamber Music | | |
| 10:30 | | | Chamber Music | | Chamber Music | | |
| 11:00 | Chamber Music | | Eanju Lee (713)863-0541 eanju@hotmail.com | | Matt Piatt (713)743-7066 mattphatt@hotmail.com | | |
| 11:30 | Chamber Music | | Eanju Lee (713)863-0541 eanju@hotmail.com | | Matt Piatt (713)743-7066 mattphatt@hotmail.com | | |
| 12:00 | Chamber Music | | Tania Chavez-Nader (713)440-7690 chanalinda@yahoo.com | Chamber Music | Tania Chavez-Nader (713)440-7690 chanalinda@yahoo.com | | |
| 12:30 | Chamber Music | | Tania Chavez-Nader (713)440-7690 chanalinda@yahoo.com | Chamber Music | Tania Chavez-Nader (713)440-7690 chanalinda@yahoo.com | | |
| 1:00 | Graduate Accompanying Seminar 0- thester@uh.edu | | Wendy Shaw (281)922-6828 JWSHAW10@aol.com | | Charlie Tauber (713)952-1029 charlietauber@hotmail.com | | |
| 1:30 | Graduate Accompanying Seminar 0- thester@uh.edu | | Wendy Shaw (281)922-6828 JWSHAW10@aol.com | | Charlie Tauber (713)952-1029 charlietauber@hotmail.com | | |
| 2:00 | Graduate Accompanying Seminar 0- thester@uh.edu | | Hang-Fong Au (281)499-6830 st5ig@jetson.uh.edu | Master Class | Christopher Childers (713)790-0389 sss45667@bayou.uh.edu | | |
| 2:30 | Graduate Accompanying Seminar 0- thester@uh.edu | Keyboard Collaborative Techniques 0- thester@uh.edu | Hang-Fong Au (281)499-6830 st5ig@jetson.uh.edu | Master Class | Christopher Childers (713)790-0389 sss45667@bayou.uh.edu | | |
| 3:00 | Laura Spivey (713)743-7032 nutmeg_ls@hotmail.com | Keyboard Collaborative Techniques 0- thester@uh.edu | Joy Oria (713)523-4024 jojumo@yahoo.com | Master Class | | | |
| 3:30 | | Keyboard Collaborative Techniques 0- thester@uh.edu | | Master Class | | | |
| 4:00 | | Keyboard Collaborative Techniques 0- thester@uh.edu | | | | | |

Fig 4

MUSIC EDUCATION SYSTEM

This application claims the benefit of Provisional Application Ser. No. 60/225,928 filed Aug. 17, 2000

BACKGROUND OF THE INVENTION

1. The Field of the Invention

The present invention relates to music education and, in particular, to a system for scheduling students, teachers, practice rooms, musical instruments, and an accompaniment library.

2. The Prior Art

In the field of music education there has been a long-standing problem of qualitative and quantitative matching of students, instructors and outside professional musicians in addition to coordinating rehearsal and lesson time and location which involve one or more of the above individuals. This problem is somewhat compounded by the fact that the students must, in addition to having lessons, practice and thus require both the musical selection and a room, but not necessarily an instructor. There are times that a soloist performer, either vocalist or instrumentalist, requires someone to accompany them during the practice session.

The recent vast increase in electronic gadgetry has included a substantial number of electronic musical instruments and synthesizers of the "karaoke" type which allow a performer, a vocalist in this example, to select appropriate accompaniments, an orchestral arrangement in this example, for their practice, performance and enjoyment. This has been relatively simple for vocalists since music can easily be recorded without a vocalist or prerecorded music can be filtered to eliminate the previous vocal. It is far more difficult for instrumentalist, particularly those involved with classical music, to find an appropriate accompaniment. Instrumentalist and vocalists only have access to "run-throughs" of these pieces which do not include wood block cues to train rhythmic aspects and coordinate ensemble. Furthermore, it is virtually impossible to find selections which offer only the solo musical line so that the accompanist can practice his or her part. One reason is the lack of a musical library from which to draw musical selections and another is the difficulty in electronically remastering a classical recording to eliminate and/or feature a single instrument without unduly deteriorating the quality of the entire musical selection.

SUMMARY OF THE INVENTION

The present invention is a music education system which allows scheduling of students, teachers, rooms, accompanists, and employees or consultants.

The scheduler portion of the invention has a database which includes all pertinent information on rooms (size, location, permanent equipment, etc.), teachers (availability, specialties, etc.), students (level of accomplishment, other academic schedules, etc.), accompanists (instruments, availability, skill levels, etc.), and administration (academic calender, access, etc.). This allows for matching of students, teachers, rooms, etc. and printing of schedules for all persons involved in a music program.

Another aspect of the present invention lies in a specific and unique method for recording music designed to assist in practicing and preparatory score study by individual musicians with or without accompaniment. The method has the steps of setting a metronome speed at about 0.5 to 0.75 performance tempo, and then sequencing a musical selection in the following order: first wood block cue preparatory upbeats on a first channel; piano part on a second channel; solo part on a third channel transposed by octave out of the range of piano accompaniment; solo part on a fourth channel at printed pitch using appropriately-sequenced voice; second wood block cue main beats throughout piece on a fifth channel; third wood block cues necessary for soloist on a sixth channel; fourth wood block cues necessary for pianist on a seventh channel; any additional offbeat or special wood block cues on eighth or subsequent channels; and any sectional or skeletal tracks on remaining channels.

BRIEF DESCRIPTION OF THE DRAWINGS

The present invention will now be described, by way of example, with reference to the accompanying drawings in which:

FIG. 4 is a representative instructor schedule print out.

DESCRIPTION OF THE INVENTION

Figure 1:
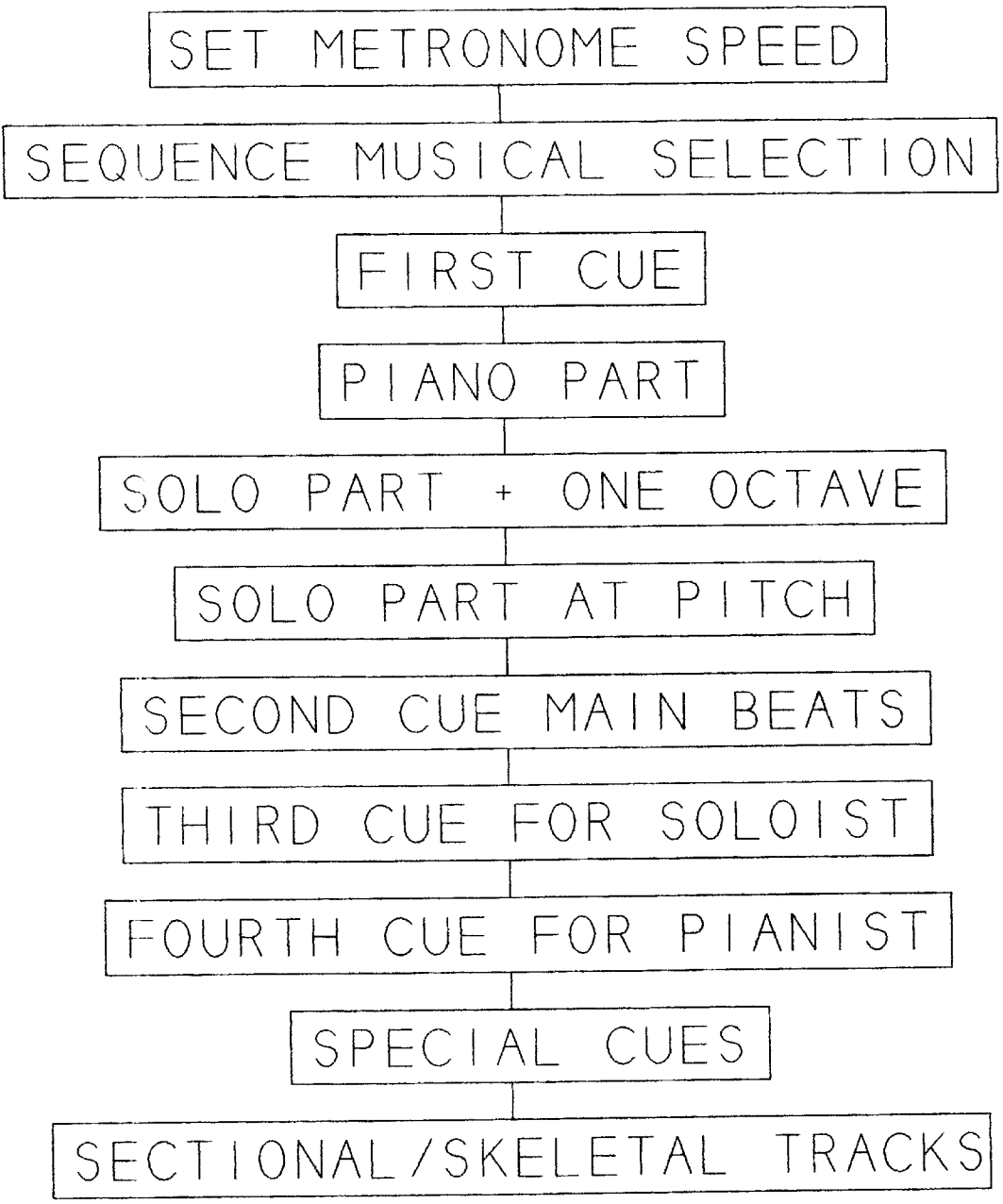
FIG. 1 is a block level schematic of the steps involved in creating a musical selection library.
Figure 2:
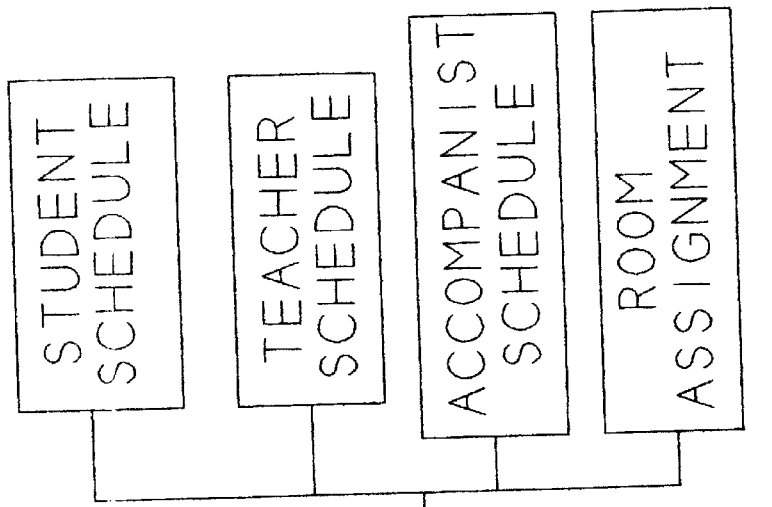
FIG. 2 is a block level schematic of the steps involved in creating the scheduling portion of the present invention.
Figure 2:
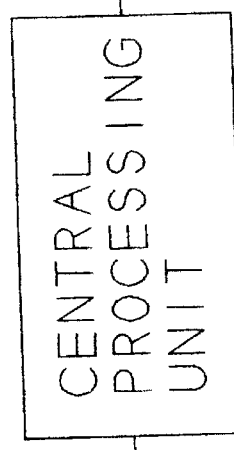
Figure 2:
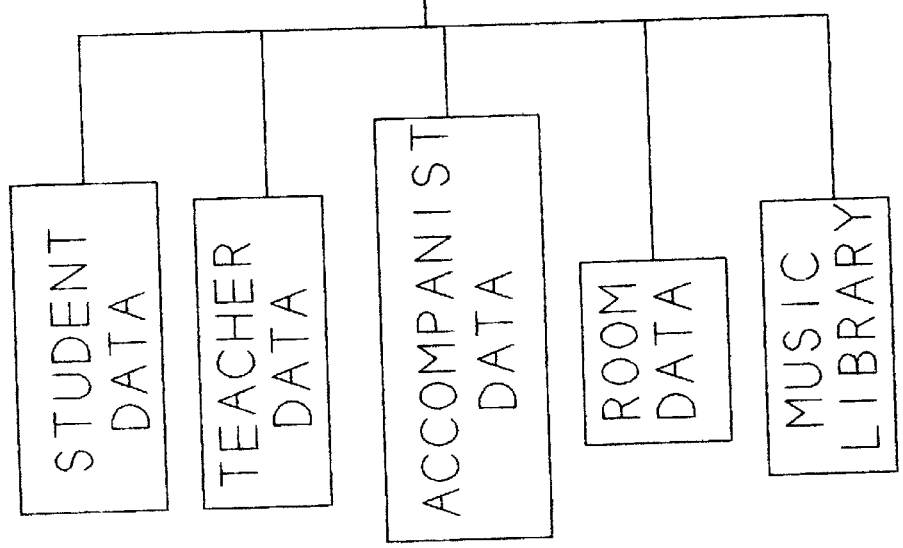
Figure 3:
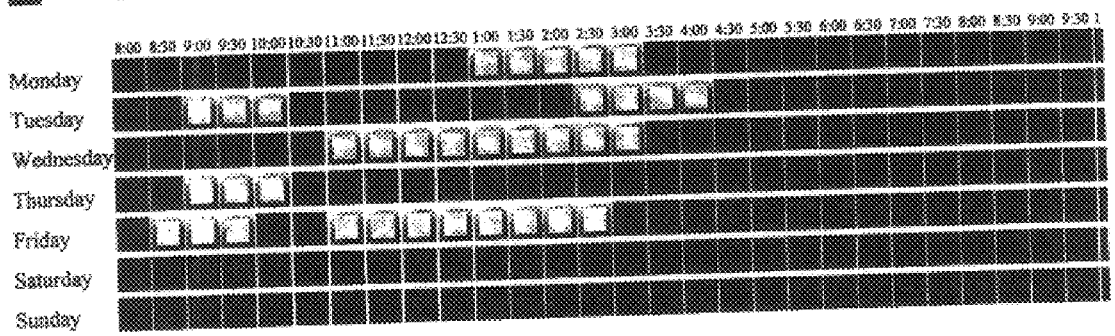
FIG. 3 is a representative scheduler screen for the subject invention.

The present invention is suitable for use with any of the many electronic musical instruments and systems which are computerized. The computer portion of the subject system includes programmable data storage and Internet capability, which will be referred to hereinafter as "Rehearsalnet." For the sake of convenience, the subject invention will be described with reference to the DISKLAVIER® by the Yamaha Corporation which has a built-in computer hard drive and sensor devices integrated with an acoustic piano enabling the piano to play by itself when a floppy disk is inserted. The DISKLAVIER® includes a tone generation module allowing instant access to a full spectrum of instrumental accompaniment with the ability to adjust the balance between piano and ensemble volume to achieve the desired mix.

The present invention is an educational tool for musicians which contains a database of midi-files, searchable by composer name, instrument or title, from which any music student can easily access and download the musical work of his or her choice. If downloaded onto a floppy disk and inserted into a DISKLAVIER® or the like, the files may then be played back for student training and practice.

A database of midi-files is designed to hold almost an infinite number of accompaniments. Each file is designed and created to help each student gain command of musically and technically challenging passages by offering various rehearsal tracks, each one focusing on a different approach to help the student solve rhythmic, melodic and collaborative dilemmas. Not only is the present invention useful for an instrumentalist or vocalist to hear the accompaniment play, but will also enable pianists to hear the sequenced solo line so the pianists can practice their score reading and rhythmic skills as well.

The necessity for a tool like this is apparent in virtually all music schools where the inherent lack of willing and able student pianists to assist instrumental and vocal students creates less-than-ideal learning situations. In many cases, having a less-experienced accompanist can be a hindrance to the student musician, ultimately leading to the last-minute hiring of a professional accompanist to play examinations or recitals. Student pianists are usually over-burdened by their own solo literature and tend to place accompaniments last on their list of preparation. One reason that many piano students are usually over-burdened is due to the lack of a broad-base of instruction in the earlier crucial years of study. Their training should include collaborative skills and sight reading; however, due to the two-edged sword of competitions, the students end up focusing on just a few solos and play them over and over at various auditions. The competitions are good in that they encourage performance experience and instill confidence and self-esteem; but, these competitions also prevent the students from progressing in a well-rounded manner essential to becoming properly equipped to survive and excel in the world of professional music. The present invention fills this gap in training, avoiding future stress among piano students and training instrumental and vocal students by the touch of a finger. By entering a work (located by searching composer name, instrument or title) the student will be furnished information as to whether the work is available in the midi library as well as lists of student accompanists and professional musicians who know that particular work. The information could also include an indication of musical skill required for playing the selection.

Upon entering the program, the student logs-in and goes to the Catalog which houses all of the files in the midi-library which preferably is with the Scheduler. The Accompanist portion of the Scheduler enables a sector of students to use a scheduling system which coordinates rehearsal times, locations and lessons, with or without an instructor, within a music school not only with student accompanists, but outside professional accompanists as well The fields in this Schedule portion of the database are listed and linked in the description below. After uploading their own information into the system, students and faculty will have access to all pertinent information as well as the Catalog of uniquely created midi-files. More recent compositions in the Catalog will be licensed through ASCAP, Sesac, and The Harry Fox Agency.

A unique method is used for creating the midi files of classical compositions is as follows: Initially, a Preparatory Master File is created by setting a metronomic tempo which is usually slower than the composer's marking, recording the accompaniment after one measure of lead-in ticks, and finally recording the solo part over all of this at one to two octaves higher so that when played back, the student musician can select either or both parts to hear while practicing. The degree to which files may be manipulated on a computer depends upon whether the computer has software which can deal with midi files or not.

The next step is to create a Ruboto Master File. A wood block cue (usually one measure) is sequenced onto a track, the accompaniment is recorded and solo part recorded. Then, two more separate tracks of wood block cues are sequenced. The first of these is a track of cues necessary for the soloist to maintain good ensemble and the second is a track of cues necessary for the pianist to maintain good ensemble. These cues are not necessarily on every beat—they are designed to teach the musician the specific places where they have the control of the music. By not including them in certain areas, they teach the musician where they have to listen to the other musician's part carefully in order to develop collaborative skills. Many times these cues are put on the "off-beat" in order to allow the musician the actual control of the beat itself. Because a tick is only a reference to the beat, and not a definite of the musical meaning of the beat, it makes sense to put it in between beats quite often so that momentum or forward and backward flow can be achieved when practicing.

After editing the Rubato Master File to artistic satisfaction, various other files are created by deleting appropriate tracks. The Accompaniment File (Acc) is created by deleting the solo part and the solo wood block cue part. The Soloist File (Solo) is created by deleting the accompaniment part and the accompanist wood block cue part. The Performance File (Perf) is created by deleting all wood block cue parts.

Additional files are created in the event that certain specific passage work (traditional trouble spots in the literature) must be practiced. This type of file is called the Sectional File.

Students download all of these files at the same time because they are zipped-up and include a file for tuning.

Files for vocalists differ slightly. When recording the Preparatory File, additional tracks are recorded. The Skeletal File consists of the bass-line track and the solo track so that the vocalist can learn to hear the solo part as it relates to the bass-line. When recording the Master File, the Bass-line track is sequenced as in the Preparatory File, yet the recording the wood block cues (used here instead of metronomic tick) is most often on the "off-beat." Additional Files are made for both the vocalist and pianist which are the same as the Accompanist and Solo files, but with less wood block cues to wean the musicians into the flow of the music without an abundance of direction from anything other than the part of the other musician.

The Administrative side of the site has areas for categories, products, composers and files where the staff can access information, upload files and control all available features.

The second portion of the subject system is the Scheduler referred to above. This feature includes in the database all of the personnel (students, instructors, and other professionals) as well as the physical plant, musical library, and musical instruments.

Accompanist Scheduling is a search feature which filters by: day needed, time needed, amount of time needed, and skill level. By clicking on a student's name, their schedule appears. By clicking on one of the boxes which signifies a 30 minute segment of their schedule, an accompanist assignment can be made.

Room Scheduling is a printable calendar which can be navigated forward and backward on a monthly basis. Events listed can also be presented in a printable list form. Options include search feature by topic, description, or contact person. Events can be added into the calendar by including details such as location, time, duration, topic, description and contact data.

Personnel Manager is a listing of all Rehearsalnet members which is filterable by last name, first name, user name, password, party, party ID, teacher and any other data deemed appropriate. Each member main data can be deleted or edited from this page. New teacher listings can be entered from this page as well.

Room Manager allows listing the various rooms with information about room number, location, capacity, special features, and room name. Room Manager includes information on any permanently installed instrument, such as a pipe organ, so that students wishing to practice on this instrument would only be scheduled in the room with the pipe organ. This information is tied in with the Room Scheduler so that events can be located and found efficiently.

Display Special Requests houses information which is entered by students and teachers on their personal information/special request upload forms. It is filterable by teacher, student or both.

Total Personnel Usage keeps a running total of the number of all party types in the Scheduler along with their phone numbers and E-mail addresses.

Students per Teacher lists students grouped by teacher. It also contains their contact information, including direct E-mail.

List Student by Accompanist lists all of the student soloists next to their accompanist. It also contains basic contact of all parties involved.

Custom List Creator has a search feature of all members of Rehearsalnet, filterable by party ID, which lists search results. From the result, a list may be generated which can be E-mailed or printed.

Personnel Meeting Scheduler lists all Rehearsalnet members and can overlay any selected weekly schedules in order to ascertain optimum meeting times.

Chamber Music Scheduler has a search feature which finds all students who are enrolled in chamber music at any given time during the week.

Calendar/Current Calendar Month/Printable Calendar can be navigated forward and backward on a monthly basis. Events listed can also be presented in a printable list form Options include search feature by topic, description, or contact person. Events can be added into the calendar by including details such as location, time, length, topic, description and contact data.

Upon accessing the link to the midi library, the administrator has the following options: midi library checks filename lists and all the zip file names which are housed in the library.

Upload Midi-File page is the mechanism which uploads midi files into the library. It has a browse button which enables the file to be selected, then details are listed, such as composer name, title, key, Opus, instrumentation, version, description/comments, Readme file (links to htm instruction file which describes various midi track details), owner name, cost to consumer and email information which automatically notifies customer that file is ready to be accessed and also notifies the Rehearsalnet library archives that a new entry has been made.

Edit/Delete Midi File lists all of the zip files in the library and from this location, they can be edited (administrator views the upload page and can alter it from this location) or deleted.

Re-Upload from this location, edited zip files may be re-uploaded into the library.

Upon logging on to his or her personal page, a teacher will have the following options: View my schedule presents a weekly schedule in colored box format for quick overview of their schedule. On PC's, if mouse hovers above a box, it describes details in "bubble" next to the pointing arrow. View/Print Detailed Schedule lists a weekly schedule with all contact data for the teacher's student and their accompanist. Edit Personal/Student Information allows the teacher to edit his/her personal/contact information. Change Password the teacher can alter his/her password. View Accompanying Information allows the teacher to view their students and students' accompanists names and contact data in simple list. Search for Staff/Outside Professional Accompanist allows the teacher to search for Staff/Outside Professional Accompanist with options such as: day needed, time needed and amount of time needed.

Upon logging on for the first time, the student fills out a form which requests basic information such as: name, contact information, scholarship information, special request, teacher name, recital information and academic level. After submitting this form, they are presented with a blank schedule. By clicking on one of the green boxes which signify a 30 minute segment, they can select options such as: class, teaching privately, chamber music, working or free. This schedule can be easily edited. Other options on this schedule page are noted below.

View My Schedule presents a weekly schedule in colored box format for quick overview of schedule. On PC's, if mouse hovers above a box, it describes details in "bubble" next to the pointing arrow.

View/Print Detailed Schedule lists a weekly schedule with detailed information in a printable format.

Edit Personal/Student Information the student can edit his/her personal information including Change Password which allows the student to alter his/her password.

View Accompanying Information lists the contact data of the collaborative partner assigned.

Search for Staff/Outside Professional Accompanist allows the teacher to search for Staff/Outside Professional Accompanist with options such as: day needed, time needed and amount of time needed. This data can be listed as a weekly schedule with detailed information in a printable format including day needed, time needed and amount of time needed.

Edit Personal Information/Area of Specialty enables the staff or outside professional accompanist to alter his/her personal information or area of specialty.

The Midi Library is a tool to assist working musicians in the preparation of music, as discussed above. The midi library has two components. The first component is a public-access store, available to musicians anywhere for purchasing and downloading midi files that have been created to assist musicians in learning music. The second component is available only through the Scheduler, and allows a music school to build their own library of midi files through file uploading and database organization.

Each work in the on-line catalog will have a series of rehearsal tracks to help musicians master the various challenges which the score presents. Some tracks will have metronomic settings assigned and others will be played with rubato and include wood block cues to help coordinate ensemble.

Piano accompaniments will help instrumentalists or vocalists learn their music; and pianists who are trying to learn their piano accompaniments will have access to only the solo line to practice hearing and playing along with the "virtual" soloist. These files are not designed to replace human interaction; they are conceived as practice tool (somewhat like a batting cage is for the professional baseball player), to help refine collaborative skills.

The Scheduler uses the Internet to facilitate tedious scheduling needs. It features its own midi library; accompaniment assignments; instant email notifications; powerful search engines; library; contact lists; printable schedules; locating and contacting outside professional accompanists;

The Scheduler was designed to be an open-ended application; it can be filly customized to demonstrate the needs of the school it is serving.

The present invention may be subject to many modifications and changes without departing from the spirit or essential characteristics thereof The foregoing description should therefor be considered in all respects as illustrative and not restrictive as to the scope of the invention as defined by the appended claims.

I claim:

1. A method for creating a work for inclusion in a musical library, which library contains a plurality of midi files, each midi file containing up to sixteen tracks, each track having been derived from one of two types of master recordings, said work being created by recording music for practice by individual musicians with or without accompaniment to assist nusicians in all facets of practicing and preparatory score study in order to improve understanding and command of a particular piece of music, said method comprising the steps of:

setting a metronome speed at a tempo less than an indicated performance tempo;

sequentially recording relevant portions of a musical selection in the following order:

recording first wood block cue preparatory upbeats on a first track;

recording piano pan accompaniment on a second track;

recording solo part on a third track transposed by at least one octave above or below the piano part accompaniment depending upon the solo instrument;

recording solo part on a fourth track at printed pitch using sequenced voicing wherein tone color selected is dependent upon the piece being performed for optimum educational effectiveness;

recording second wood block cue main beats throughout piece on a fifth track;

recording third wood block cues required to coordinate rhythmic ensemble in an efficient manner for a soloist on a sixth track;

recording fourth wood block cues for a pianist on a seventh track;

recording additional offbeat or sets of wood block cues on next successive tracks; and recording any sectional or skeletal tracks on remaining tracks.

2. The method according to claim 1 further comprising the steps of editing the recorded file and choosing whether or not any recorded track needs to have sequenced rubato.

3. The method according to claim 1 wherein said first track is designed to help both soloist and accompanist to learn their parts under tempo with a strict metronomic beat by selectively muting the piano part or the solo part.

4. The method according to claim 1 wherein said second track, designated a preparatory track, is in a strict, metronomic format with tracks which are under tempo, wood block cues are added on all pulses and in faster tempo tracks, minimal wood block cues are added to help coordinate ensemble.

5. The method according to claim 1 wherein said third track, designated off-beat track, shows reference "ticks" on the off-beats so that the soloist may place main beats with freedom.

6. The method according to claim 1 wherein said fourth track, designated skeletal track, is designed to show specific elements of the music.

7. The method according to claim 6 wherein said specific elements, in a vocal song has only the bass line of the accompaniment in order to help the vocalist learn the relationship of their melody to the bass line.

8. The method according to claim 6 wherein said specific elements, in a string concerto, only contain the woodwind chords, as opposed to full orchestra score, so that the string player can practice a specific passage hearing one element at a time.

9. The method according to claim 1 wherein said fifth track, designated sectional track, is a rehearsal track which focuses on a smaller portion of the score which might have a specific need for repetitive practice.

10. The method according to claim 1 wherein said sixth track, designated solo track, is designed to help the accompanist learn to play with the solo part.

11. The method according to claim 10 wherein said sixth track, designated solo track, has wood block cues added to help teach the accompanist where they control the flow of the music.

12. The method according to claim 1 wherein said seventh track, designated accompaniment track, is designed to help the soloist learn to play with the accompaniment.

13. The method according to claim 12 wherein said seventh track, designated accompanist track, has wood block cues added to help teach the soloist where they control the flow of the music.

14. The method according to claim 1 wherein said eighth track, designated performance track, is designed to let the soloist and accompanist hear the performance of both the accompaniment and solo track simultaneously without wood block cues in order to get a sense of how the piece goes.

15. The method according to claim 1 wherein said ninth track, designated tuning track, is designated to assist in tuning.

16. The method according to claim 1 further comprising: creating schedules, respectively, for accompanist, room, teacher, and student in a master schedule.

17. The method according to claim 16 wherein said accompanist schedule has a search feature which filters by: day needed, time needed, amount of time needed and skill level.

18. The method according to claim 16 wherein said room schedule has a room manager which lists the various rooms with information about room number, capacity and room location.

19. A system for scheduling students, teachers, practice rooms, musical instruments, and an accompaniment library for music school, said system comprising:

a central processing unit having data input on students, accompanists, instructors, other professionals, the physical plant, musical library, and musical instruments; and data search means which filters said data on said students, accompanists, instructors, other professionals, the physical plant, musical library, and musical instrument data by day needed, time needed, amount of time needed, and skill level, and creates schedules matching students, accompanists, instructors, other professionals, the physical plant, musical library, and musical instruments; and;

means for printing out said schedules.

20. The scheduling system according to claim 19 further comprising:

an accompanist scheduling search feature which filters by day needed, time needed, amount of time needed, and skill level.

21. The scheduling system according to claim 19 further comprising:

a room scheduling printable calendar which can be navigated forward and backward on a monthly basis and includes location, time, duration, topic, description and contact data.

22. The scheduling system according to claim 19 further comprising:

a personnel manager listing of all members which is filterable by last name, first name, user name, password, party, party ID, teacher and other scheduling data.

23. The scheduling system according to claim 19 further comprising:

a room manager listing rooms with information about room number, location, capacity, special features, and room name.

24. The scheduling system according to claim 19 further comprising:

specialized searching features including students by teacher, students by accompanist, students by speciality, and students by accomplishment level.

25. The scheduling system according to claim 19 further comprising:

a personnel meeting scheduler whereby all members can overlay any selected weekly schedules in order to ascertain optimum meeting times.

26. The scheduling system according to claim 19 further comprising:

a midi-file upload having browse capability which enables a file to be selected and lists details, such as composer name, title, key, Opus, instrumentation, version, description/comments.

* * * * *